United States Patent [19]
Lubold et al.

[11] Patent Number: 5,410,679
[45] Date of Patent: Apr. 25, 1995

[54] METHOD AND APPARATUS FOR CONCURRENTLY SUPPORTING MULTIPLE LEVELS OF KEYBOARD DISPLAY TERMINAL FUNCTIONALITY ON A SINGLE PHYSICAL INPUT/OUTPUT CONTROLLER INTERFACE IN AN INFORMATION HANDLING SYSTEM

[75] Inventors: Paul G. Lubold, Kingston; Ronald S. Manka, Woodstock, both of N.Y.; Robert A. Niemitalo, Cary, N.C.; Karen S. Porter, Saugerties, N.Y.

[73] Assignee: International Business Machines Corporatin, Armonk, N.Y.

[21] Appl. No.: 974,677

[22] Filed: Nov. 12, 1992

Related U.S. Application Data

[63] Continuation of Ser. No. 517,281, May 1, 1990, abandoned.

[51] Int. Cl.⁶ ............................................. G06F 13/00
[52] U.S. Cl. .................................. 395/500; 395/275; 395/250; 364/239; 364/DIG. 1
[58] Field of Search .............. 395/500, 800, 200, 250, 395/275

[56] References Cited

U.S. PATENT DOCUMENTS

| | | | |
|---|---|---|---|
| 4,107,781 | 8/1978 | Barrett et al. | 364/200 |
| 4,271,479 | 6/1981 | Cheselka et al. | 364/900 |
| 4,550,386 | 10/1985 | Hirosawa et al. | 364/900 |
| 4,811,284 | 3/1989 | Adler et al. | 364/900 |
| 4,910,505 | 3/1990 | Beaven et al. | 340/750 |

*Primary Examiner*—William M. Treat
*Attorney, Agent, or Firm*—Lynn L. Angspurger; C. Lamont Whitham

[57] ABSTRACT

Higher functions terminals and lower function terminals, as well as dual mode terminals that are selectively operated at either functional level, are simultaneously supported on a common control unit interface in an information handling system. Communications with single mode terminals are directed to a buffer portion having a predetermined base address. Each dual mode terminal contains a buffer that is partitioned into respective portions used for communications at different function levels. Communications at a lower functional level are conducted through the buffer portion containing the base address while communications at a higher functional level are redirected to a buffer portion containing shifted addresses. The control unit includes means for determining the suitable level of terminal function and adjusting the addressing of the terminal buffer accordingly.

2 Claims, 3 Drawing Sheets

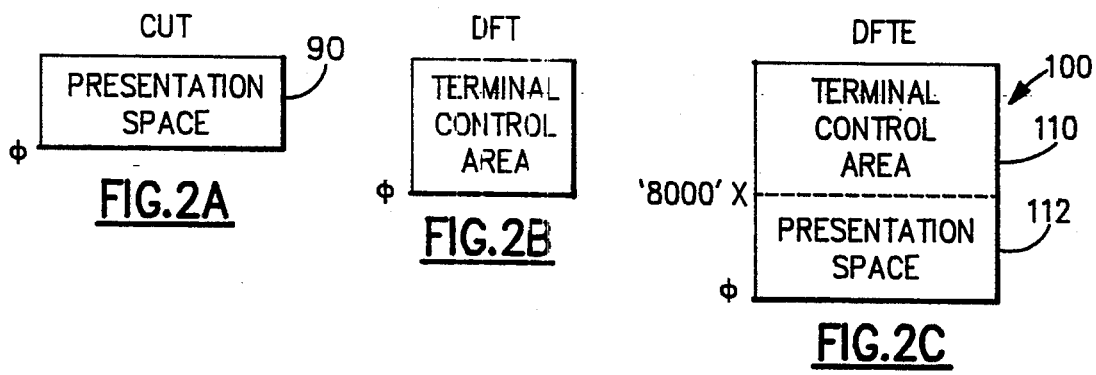
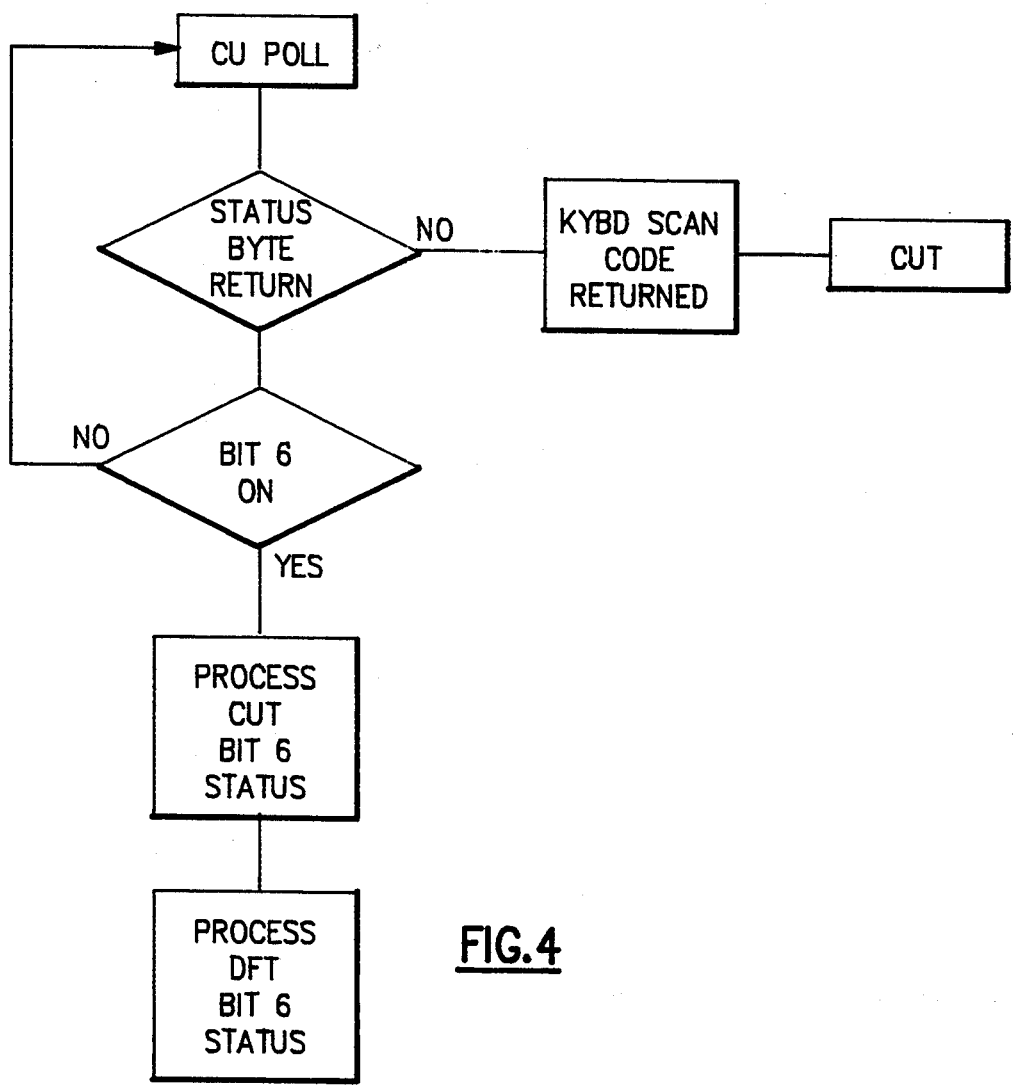

METHOD AND APPARATUS FOR CONCURRENTLY SUPPORTING MULTIPLE LEVELS OF KEYBOARD DISPLAY TERMINAL FUNCTIONALITY ON A SINGLE PHYSICAL INPUT/OUTPUT CONTROLLER INTERFACE IN AN INFORMATION HANDLING SYSTEM

CROSS-REFERENCE TO RELATED APPLICATION

This application is a continuation of application Ser. No. 07/517,281 filed by the applicants of this application on May 1, 1990, and now abandoned.

BACKGROUND OF THE INVENTION

1. Field of the Invention

The present invention relates to information handling systems having I/O subsystems, and more particularly to such information handling systems wherein input/output (I/O) subsystems include a number of I/O terminals connected to controllers which control communication between a host processor in the information handling system and the terminals.

2. Prior Art

The present invention is an improvement to the invention described in U.S. Pat. No. 4,811,284 entitled "Computer Terminal System with Memory Shared Between Remote Devices", hereinafter referred to as the '284 patent. The teachings of the above identified patent including the drawing and specification are hereby incorporated by reference into this application.

The '284 patent generally relates to a data I/O terminal system having a device controller to which displays or other I/O devices are connected by a transmission system such as individual coax lines to the respective devices and which includes a communication buffer in the remote device to receive and transmit data and control information from and to the controller via the communication link. Although the buffer is located in the device, its use is directed by the control unit for data transmission in both directions. The control unit places data at any point in the buffer and instructs the device to process it. On completion of the required operation, the device signals the controller.

The '284 patent describes in specific detail the structure and operation of apparatus on which the present invention may be executed.

However, it should be noted that the '284 patent teaches a computer terminal system in which there may be different classes of remote devices and in which each controller is structured to operate with only one class of remote device on each terminal coax line. The controller operates with other classes of remote devices on other coax lines.

SUMMARY OF THE INVENTION

Accordingly, the apparatus and method according to the present invention controls two or more types of remote devices on a single physical interface. A first type of device, a higher function display terminal and a second type device, a lower function display terminal, as well as dual mode terminals which may be selectively operable at either the higher functional level or the lower functional level are simultaneously supported by a single controller across a common control unit to terminal interface. Each terminal contains an addressable buffer which is used for communications with the controller. Communications with single mode terminals are directed to a buffer portion having a predetermined base address. Each dual mode terminal contains a buffer which is partitioned into respective portions which are used for communications at the different functional levels. Communications at the lower functional level ape conducted through the buffer portion containing the base address, while communications at the higher functional level are redirected to the buffer portion containing shifted addresses by providing an offset to the address for the high function terminal communications. Means are provided in the controller fop determining the level of terminal function and adjusting the address of the buffer accordingly.

It is a primary advantage of the present invention that terminal devices of different levels of functionality may be connected to a common controller interface.

Other objects and advantages of the invention will be apparent from the specification, drawing and claims contained herein.

BRIEF DESCRIPTION OF THE DRAWING

FIGS. 2 A, B, and C are schematic diagrams of terminal buffer configurations for different terminal types in accordance with the present invention.

FIG. 4 is a flow chart of the process for determining the terminal type providing a response to a control unit poll.

DETAILED DESCRIPTION OF A PREFERRED EMBODIMENT.

Information handling systems generally have a host processor for processing data and an I/O subsystem for moving the input data and the processed output data back and forth across the human/machine interface.

Figure 1:
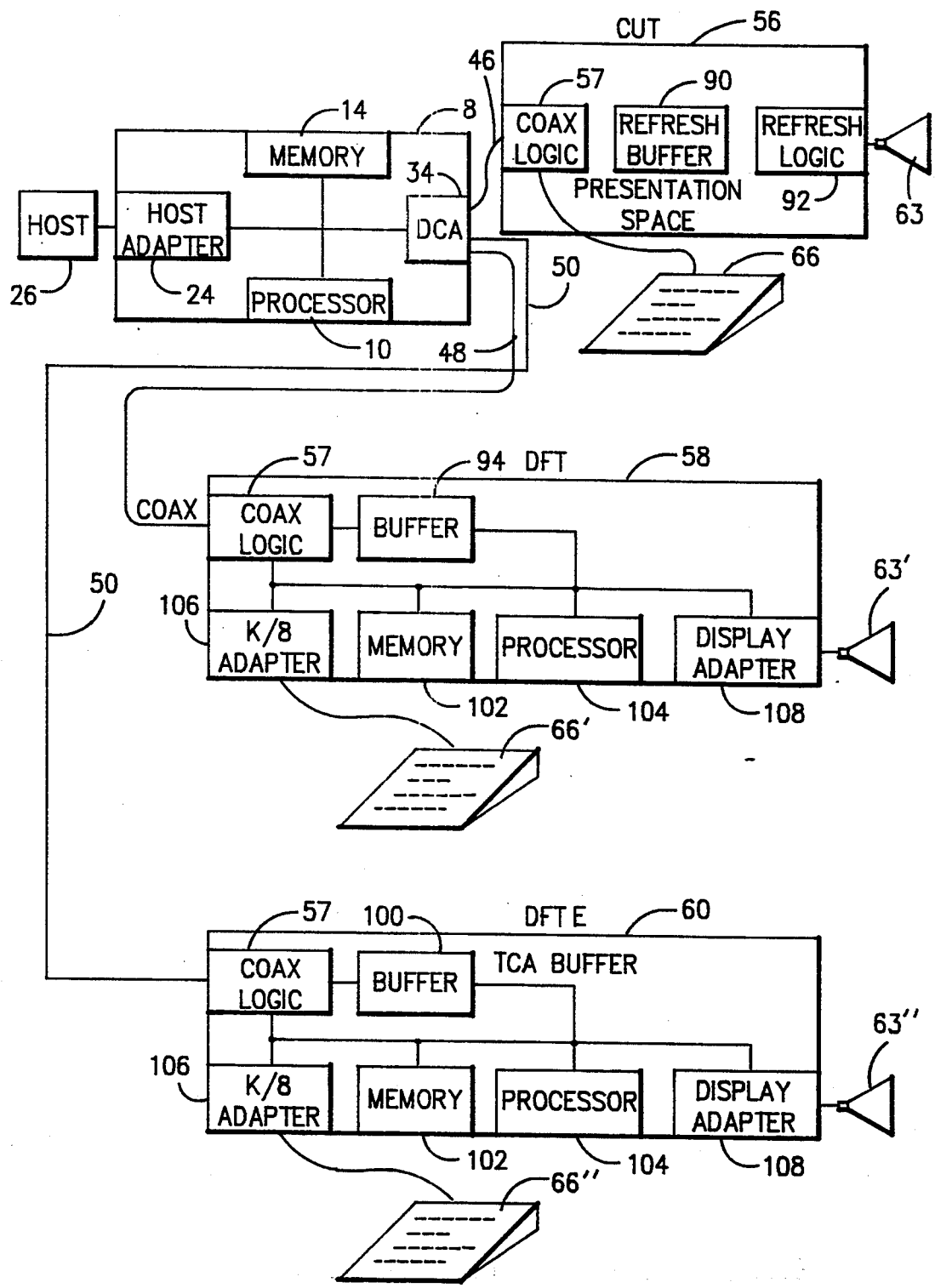
FIG. 1 is a block diagram of an information handling system embodying the present invention.

FIG. 1 shows such art information handling system including a host processor 26 connected to an I/O controller 8 which controls communication with a low function terminal 56, sometimes referred to as a Control Unit Terminal (CUT) by cable 46, a high function terminal 58 referred to as Distributed Function Terminal (DFT) 58 and dual function terminal (DFTE) 60.

CUT 56 includes interface logic 57 for data communications with controller 8, a refresh buffer 90 which contains the presentation space for the data to be displayed, refresh logic 92 which controls the display of information contained in refresh buffer 90 on display monitor 63. A keyboard 66 is also controlled by communications logic 57 for data input.

In contrast to the somewhat simple CUT 56, DFT 58 is an intelligent terminal having therein a processor 104, a memory 102, a keyboard adapter 106, in addition to communications logic 57 and a larger buffer 94 which provides additional functions beyond storing data for refresh of the display monitor, a display adapter 108 for controlling the presentation of data on display monitor 63'.

DFT 58 is a high function device capable of handling complex functions not readily handled in a multi device controller 8. As a result, the interface for DFT/controller interchange is set up as a high throughput, asynchronous, full duplex message interface as opposed to the relatively low throughput, highly responsive keystroke interface used for CUT 56.

By extending the prior art DFT interface to allow CUT interface to co-exist on the control unit to terminal cable, a single controller 8 is able to efficiently handle the low function CUT 56 and the high function DFT 58 simultaneously on the same coax cable without restricting the support for either device type.

Dual function terminal (DFTE) 60 can operate either in CUT mode or in DFT mode.

The structure of DFTE 60 is substantially the same as DFT 58 except that buffer 100 is larger to accommodate presentation space 112. See FIG. 2C for CUT mode at base address and TCA 110 for DFT mode at a redefined origin of 8000 hexadecimal.

Referring now also to FIGS. 2A, B, and C, the organization of buffers 90, 99, and 100 will be described.

As discussed above, buffer 90 in CUT 56 acts solely as a refresh buffer for information to be displayed on monitor 63. Refresh buffer 90 acts as a presentation space being addressable at a base address from 0 to the maximum address of the data contained in the presentation space.

Buffer 94 in DFT 58 contains Terminal Control Area (TCA), (see FIG. 2B). In a single mode DFT 58, the TCA resides in the buffer at a base address space beginning at address 0.

In contrast, buffer 100 in DFTE 60 is divided into two sections (see FIG. 2C). A first section 110 is the terminal control area or TCA for DFT mode. The TCA begins at address 8000 hexadecimal, A second section 112 is the presentation space for CUT mode which begins at address 0.

Normally, controller 8 would transmit data to both CUT 56 and DFT 58 beginning at address 0. However, it order to support both terminal types at the same time on the same line, a dual mode terminal (DFTE) 60 is required. In the DFTE 60, the TCA has been relocated to an origin address of hexadecimal 8000. Therefore, any commands to the DFT interface on DFTE 60 must have the origin address adjusted by hexadecimal 8000

After power-on initialization both the DFT interface and the CUT interface are active. Data can flow on either interface and the response to any controller poll by the device can apply to either interface or both interfaces.

Figure 3:
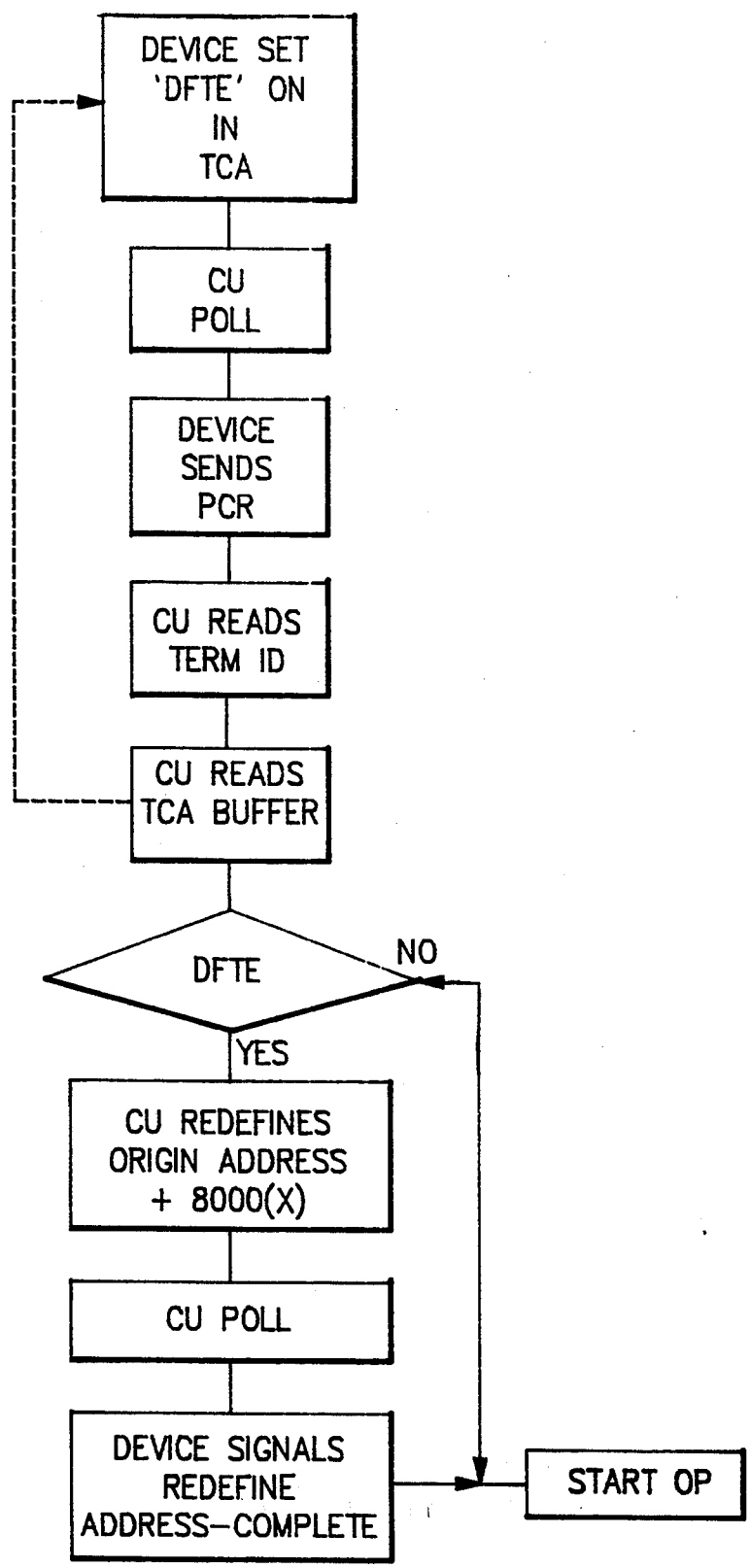
FIG. 3 is a flow chart of the address redefine process in accordance with the present invention.

The power-on initialization will be described in more detail with reference to the flow chart of FIG. 3.

At power-on initialization a device which implements the present invention sets a flag "DFTE" on in buffer 100. Subsequently, when control unit 8 polls the connected terminals, the device sends the power-on response POR and the control unit reads the terminal identification. The control unit 8 then reads buffer 100 and determines that the "DFTE" ON flag has been set. If the device is not DFTE 60, the initialization proceeds as is described in the '284 patent.

If the DFTE flag is detected by the controller 8, a redefine command is executed within controller 8 to redefine the origin address in buffer 100 of TCA from 0 to 8000 hexadecimal.

The control unit 8 then goes into a polling state until such time as DFTE 60 signals a redefine address operation complete at which time the existing DFT initialization follows.

After power-on initialization is complete, DFT interface and the CUT interface are active. Data can flow on either interface and the response to any controller poll by a device can apply to either or both interfaces.

Referring now to FIG. 4, the controller process for differentiating between CUT terminal signals and DFT terminal signals will be described.

A response to a control unit poll may be either a status byte or a keyboard scan code. If the response is not a status byte, the keyboard code returned signals that the response is from a CUT terminal such as 56 since that is the only device type which responds with the keyboard scan code.

If the response is a status byte, a predetermined bit such as bit 6 is tested. If the predetermined bit is not set, then the controller returns to polling, If bit 6 is on, since the status byte could have been from either the DFTE interface or DFT interface, controller 8 must determine which terminal type has raised status bit 6. Accordingly, if the control unit receives bit 6 status from DFTE 60, controller 8 reads DFT interface TCA buffer status fields and CUT interface status register. If DFT status is indicated then it will be processed as described in patent '284, referred to above.

If CUT status is indicated, then such status will be processed in accordance with the description of CUT processing contained in the above referenced patent '284.

Although the invention has been described with reference to a preferred embodiment thereof, it will be understood by those skilled in the art that various changes in form and detail may be made without departing from the spirit or scope of the invention.

What is claimed is:

1. In a display data terminal system including a host processor, an input/output controller connected to said host processor and a plurality of input/output keyboard-display devices connected to said input/output controller by respective transmission links, each of said input/output keyboard-display devices including logic interfacing with a corresponding one of said transmission links and providing communication between said input/output controller and a byte addressable buffer, the improvement wherein said input/output keyboard-display devices may be a first, second and/or third type device each having a different level of functionality and said input/output controller providing a single physical interface to all said input/output keyboard-display devices regardless of the respective level of functionality of each said input/output keyboard-display device, said first type input/output keyboard-display device having a lowest level of functionality permitting direct input to said host processor via its keyboard through said interfacing logic and wherein the addressable buffer of said first type of input/output keyboard-display device provides presentation space for a display monitor to receive output directly from said host processor through said interfacing logic, said second type input/output keyboard-display device having a highest level of functionality and including processing means for permitting both input to said host processor via its keyboard through said interfacing logic while supporting additional functions and wherein the addressable buffer of said second type of input/output keyboard-display device provides a terminal control area which receives output from said host processor through said interfacing logic and interfaces with said processing means for generating an output to a display monitor, and said third type input/output keyboard-display device having a dual level of functionality permitting operation in either a first mode at said lowest level of functionality or in a second mode at said highest level of functionality and wherein the addressable buffer of said third type of input/output keyboard-display device provides both presentation space and a terminal control area, the presentation space of the buffer of said first type of input/output keyboard-display device and the terminal control area of the buffer of said second type of input/output keyboard-display device have a common base address and the presentation space and the terminal control area of the buffer of said third type of input/output keyboard-display device have different base addresses, said input/output controller at power on polling each of said plurality of input/output keyboard-display devices and receiving responses from the interfacing logic of each said device identifying said device by functionality type and mode and, for input/output keyboard-display devices of said third type, translating an origin address of data from said host processor to a base address for said terminal control area when an input/output keyboard-display device of said third type is operating in said second mode permitting said input/output controller to concurrently support multiple modes of functionality of input/output keyboard-display devices of said third type.

2. In a display data terminal system including a host processor, an input/output controller connected to said host processor and a plurality of input/output keyboard-display devices connected to said input/output controller by respective transmission links, each of said input/output keyboard-display devices including logic interfacing with a corresponding one of said transmission links and providing communication between said input/output controller and a byte addressable buffer, a method of concurrently supporting input/output keyboard-display devices of a first, second and/or third type device each having a different level of functionality wherein said input/output controller provides a single physical interface to all said input/output keyboard-display devices regardless of the respective level of functionality of each said input/output keyboard-display device, said first type input/output keyboard-display device having a lowest level of functionality permitting direct input to said host processor via its keyboard through said interfacing logic and wherein the addressable buffer of said first type of input/output keyboard-display device provides presentation space for a display monitor to receive output directly from said host processor through said interfacing logic, said second type input/output keyboard-display device having a highest level of functionality and including processing means for permitting both input to said host processor via its keyboard through said interfacing logic while supporting additional functions and wherein the addressable buffer of said second type of input/output keyboard-display device provides a terminal control area which receives output from said host processor through said interfacing logic and interfaces with said processing means for generating an output to a display monitor, and said third type input/output keyboard-display device having a dual level of functionality permitting operation in either a first mode at said lowest level of functionality or in a second mode at said highest level of functionality and wherein the addressable buffer of said third type of input/output keyboard-display device provides both presentation space and a terminal control area, the presentation space of the buffer of said first type of input/output keyboard-display device and the terminal control area of the buffer of said second type of input/output keyboard-display device have a common base address and the presentation space and the terminal control area of the buffer of said third type of input/output keyboard-display device have different base addresses, said method comprising the steps of:

polling by said input/output controller at power on each of said plurality of input/output keyboard-display devices;

receiving by said input/output controller responses from the interfacing logic of each said device identifying said device by functionality type and mode; and translating an origin address of data from said host processor to a base address for said terminal control area when an input/output keyboard-display device of said third type is operating in said second mode.

* * * * *